(12) United States Patent
Olsson et al.

(10) Patent No.: US 10,057,816 B2
(45) Date of Patent: Aug. 21, 2018

(54) SIMULTANEOUS HAND OVER IN DIFFERENT DOMAINS

(71) Applicant: Telefonaktiebolaget L M Ericsson (publ), Stockholm (SE)

(72) Inventors: Lars-Bertil Olsson, Angered (SE); Angelo Centonza, Winchester (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 138 days.

(21) Appl. No.: 14/646,923

(22) PCT Filed: Nov. 6, 2013

(86) PCT No.: PCT/SE2013/051300
§ 371 (c)(1),
(2) Date: May 22, 2015

(87) PCT Pub. No.: WO2014/112917
PCT Pub. Date: Jul. 24, 2014

(65) Prior Publication Data
US 2015/0304897 A1    Oct. 22, 2015

Related U.S. Application Data

(60) Provisional application No. 61/754,257, filed on Jan. 18, 2013.

(51) Int. Cl.
*H04W 36/00* (2009.01)
*H04W 4/90* (2018.01)
(Continued)

(52) U.S. Cl.
CPC ......... *H04W 36/0022* (2013.01); *H04W 4/90* (2018.02); *H04W 12/08* (2013.01);
(Continued)

(58) Field of Classification Search
CPC ............. H04W 36/0022; H04W 12/08; H04W 36/0038; H04W 36/0066; H04W 36/0077; H04W 36/28; H04W 4/22
See application file for complete search history.

(56) References Cited

U.S. PATENT DOCUMENTS 6,643,513 B2 * 11/2003 Timonen ........... H04W 36/0038
380/247
7,860,502 B2 * 12/2010 Kim ..................... H04B 1/7105
370/310

(Continued)

FOREIGN PATENT DOCUMENTS

| WO | 2006123863 A2 | 11/2006 | |
|---|---|---|---|
| WO | WO 2009123512 A1 * | 10/2009 | ............ H04W 36/34 |
| WO | 2011139857 A1 | 11/2011 | |
| WO | 2014112917 A1 | 7/2014 | |

OTHER PUBLICATIONS

G2-080393, titled "Support for Inter-Domain Handover", presented at 3GPP TSG-GERAN Meeting #38bis, Xi'an, P.R. China, was published Jun. 24-27, 2008.*

(Continued)

*Primary Examiner* — Andrew Lai
*Assistant Examiner* — Hoyet H Andrews
(74) *Attorney, Agent, or Firm* — Sage Patent Group

(57) ABSTRACT

The teachings relates to method (40) in a target network (node16) of a target core network in a first domain during handover, in the first and in a second domain, of a communication device (20) from a source radio access network to a target radio access network. The source radio access network comprises a source access node (11) and the target radio access network comprises a target access (node12). The method (40) comprises determining (41) whether the communication device (20) has access admission to the target core network; when a hand over fails generating (42) a hand over failure message comprising an information (Continued)

Fig. 1 element "Independent domain HandOver", where in the information element is set to a predefined value indicating whether the hand over failed due to lack of access rights or for other reasons than lack of access rights. The teachings also relates to devices and further to methods in source nodes.

18 Claims, 5 Drawing Sheets

(51) Int. Cl.
    *H04W 36/28*     (2009.01)
    *H04W 12/08*     (2009.01)
(52) U.S. Cl.
    CPC ... *H04W 36/0038* (2013.01); *H04W 36/0066* (2013.01); *H04W 36/0077* (2013.01); *H04W 36/28* (2013.01)

(56) References Cited

U.S. PATENT DOCUMENTS

| | | | | |
|---|---|---|---|---|
| 7,936,880 | B2* | 5/2011 | Huang | H04W 12/04 380/272 |
| 8,081,604 | B2* | 12/2011 | Wu | H04W 36/14 370/331 |
| 8,279,837 | B2* | 10/2012 | Qiu | H04W 36/0055 370/331 |
| 8,600,390 | B2* | 12/2013 | Vikberg | H04W 36/0066 455/436 |
| 8,768,290 | B2* | 7/2014 | Tiwari | H04W 48/16 455/404.1 |
| 8,811,935 | B2* | 8/2014 | Faccin | H04W 48/18 455/404.1 |
| 8,817,744 | B2* | 8/2014 | Rexhepi | H04W 36/0022 370/328 |
| 8,954,077 | B2* | 2/2015 | Horn | H04W 36/08 370/331 |
| 9,002,356 | B2* | 4/2015 | Horn | H04W 36/08 370/331 |
| 9,002,361 | B2* | 4/2015 | Bergquist | H04W 12/08 370/331 |
| 9,066,268 | B2* | 6/2015 | Huang | H04W 36/0055 |
| 9,131,415 | B2* | 9/2015 | Scott | H04L 29/06027 |
| 9,131,427 | B2* | 9/2015 | Wu | H04L 63/104 |
| 9,301,203 | B2* | 3/2016 | Sayeedi | H04W 28/12 |
| 9,445,310 | B2* | 9/2016 | Aoyagi | H04W 36/0005 |
| 9,445,333 | B2* | 9/2016 | Guo | H04W 36/18 |
| 9,462,513 | B2* | 10/2016 | Centonza | H04W 36/24 |
| 2007/0293224 | A1* | 12/2007 | Wang | H04W 36/0055 455/436 |
| 2010/0046476 | A1* | 2/2010 | Qiu | H04W 36/02 370/331 |
| 2010/0279695 | A1* | 11/2010 | Amirijoo | H04W 36/0055 455/438 |
| 2011/0280218 | A1* | 11/2011 | Huang | H04W 36/0055 370/331 |
| 2012/0040662 | A1* | 2/2012 | Rahman | H04W 36/0055 455/423 |
| 2012/0064884 | A1 | 3/2012 | Ramachandran et al. | |
| 2012/0196603 | A1* | 8/2012 | Mochizuki | H04W 48/02 455/436 |
| 2012/0315914 | A1* | 12/2012 | Zhang | H04B 7/155 455/439 |

OTHER PUBLICATIONS

G2-080390, titled "Support for Inter-Domain Handover", presented at 3GPP TSG-GERAN Meeting #38bis, Xi'an, P.R. China, was published Jun. 24-27, 2008.*
G2-080392, titled "Support for Inter-Domain Handover", presented at 3GPP TSG-GERAN Meeting #38, Xi'an, P.R. China, was published Jun. 24-27, 2008.*
3GPP TS 43.129 V10.0.0 (Mar. 2011), titled "Packet-switched handover for GERAN A/Gb mode; Stage 2" (TS 43.129 hereinafter) was published as Technical Specification Group GSM/EDGE Radio Access Network; Packet-switched handover for GERAN A/Gb mode; Stage 2, (Release 9), pp. 01-95 on Mar. 2011.*
ETSI TS 123 401 V9.10.0 (Oct. 2011), titled "LTE; General Packet Radio Service (GPRS) enhancements for Evolved Universal Terrestrial Radio Access Network (E-UTRAN) access", (TS 123.401 hereinafter) was published Oct. 2011, pp. 01-261.*
NP-020358, titled "LS on Shared Networks", (NP-020358 hereinafter) was published Sep. 4-6, 2002, by at the 3GPP TSG CN Plenary Meeting #17, in Biarritz, France, Source: CN4, as Agenda item: 5.1, as a Document for: Information.*
3GPP TS 29.010 V11.0.0 (Jun. 2012), titled 3rd Generation Partnership Project; Technical Specification Group Core Network and Terminals; Information element mapping between Mobile Station—Base Station System (MS—BSS) and Base Station System—Mobile-services Switching Centre (BSS—MSC); Signalling procedures and the Mobile Application Part.*
GSM 05.08 Technical Specification Version 5.1.0 dated Jul. 1996, titled "Digital cellular telecommunications system (Phase 2+); Radio subsystem link control (GSM 05.08)", (GSM 05.08 hereinafter) was published Jul. 1996, pp. 01-39.*
Alcatel-Lucent, "R3-131758: Correction of Transparent Container to support CS emergency call relocation in case of PS domain HO failure," 3rd Generation Partnership Project (3GPP), TSG-RAN WG3 #81-bis, Oct. 7-11, 2013, 15 pages, Venice, Italy.
Author Unknown, "Technical Specification Group Core Network and Terminals; 3GPP Evolved Packet System (EPS); 3GPP Evolved General Packet Radio Service (GPRS) Tunnelling Protocol for Control plane (GTPv2-C); Stage 3 (Release 13)," Technical Specification 29.274, Version 13.1.0, 3GPP Organizational Partners, Mar. 2015, 317 pages.
Author Unknown, "Technical Specification Group Core Network and Terminals; General Packet Radio Service (GPRS); GPRS Tunnelling Protocol (GTP) across the Gn and Gp interface (Release 13)," Technical Specification 29.060, Version 13.0.0, 3GPP Organizational Partners, Mar. 2015, 185 pages.
Author Unknown, "Technical Specification Group GSM/EDGE Radio Access Network; Packet-switched handover for GERAN A/Gb mode; Stage 2 (Release 11)," Technical Specification 43.129, Version 11.0.0, 3GPP Organizational Partners, Sep. 2012, 95 pages.
Author Unknown, "Technical Specification Group Radio Access Network; Evolved Universal Terrestrial Radio Access Network (E-UTRAN); S1 Application Protocol (S1AP) (Release 12)," Technical Specification 36.413, Version 12.5.0, 3GPP Organizational Partners, Mar. 2015, 301 pages.
Author Unknown, "Technical Specification Group Radio Access Network; UTRAN Iu interface Radio Access Network Application Part (RANAP) signalling (Release 11)," Technical Specification 25.413, Version 10.8.0, 3GPP Organizational Partners, Dec. 2012, 428 pages.
Author Unknown, "Technical Specification Group Radio Access Network; UTRAN Iu interface Radio Access Network Application Part (RANAP) signalling (Release 10)," Technical Specification 25.413, Version 11.2.0, 3GPP Organizational Partners, Dec. 2012, 440 pages.
Author Unknown, "Technical Specification Group Services and System Aspects; General Packet Radio Service (GPRS) enhancements for Evolved Universal Terrestrial Radio Access Network (E-UTRAN) access (Release 11)," Technical Specification 23.401, Version 11.4.0, 3GPP Organizational Partners, Dec. 2012, 284 pages.
Author Unknown, "Technical Specification Group Services and System Aspects; General Packet Radio Service (GPRS); Service description; Stage 2 (Release 11)," Technical Specification 23.060, Version 11.4.0, 3GPP Organizational Partners, Dec. 2012, 335 pages.

(56) References Cited

OTHER PUBLICATIONS

Huawei, "R3-120549: Discussion on handover to a CSG cell with emergency call," 3rd Generation Partnership Project (3GPP), TSG-RAN WG3 #75-bis, Mar. 26-30, 2012, 3 pages, San Jose del Cabo, Mexico.
NEC, "R3-122171: Correction on relocation with an emergency call," 3rd Generation Partnership Project (3GPP), TSG-RAN3 #77-bis, Oct. 8-12, 2012, 4 pages, Lecce, Italy.
NEC, "R3-122668: Discussion of Correction on relocation with an emergency call," 3rd Generation Partnership Project (3GPP), TSG-RAN WG3 #78, Nov. 12-16, 2012, 2 pages, New Orleans, USA.
NEC, "R3-122669: Correction on relocation with an emergency call," 3rd Generation Partnership Project (3GPP), TSG-RAN3 #78, Nov. 12-16, 2012, 4 pages, New Orleans, USA.
International Search Report for PCT/SE2013/051300, dated May 15, 2014, 5 pages.
Extended European Search Report and Supplementary European Search Report for European Patent Application No. 13871908.3, dated Jul. 12, 2016, 7 pages.

\* cited by examiner

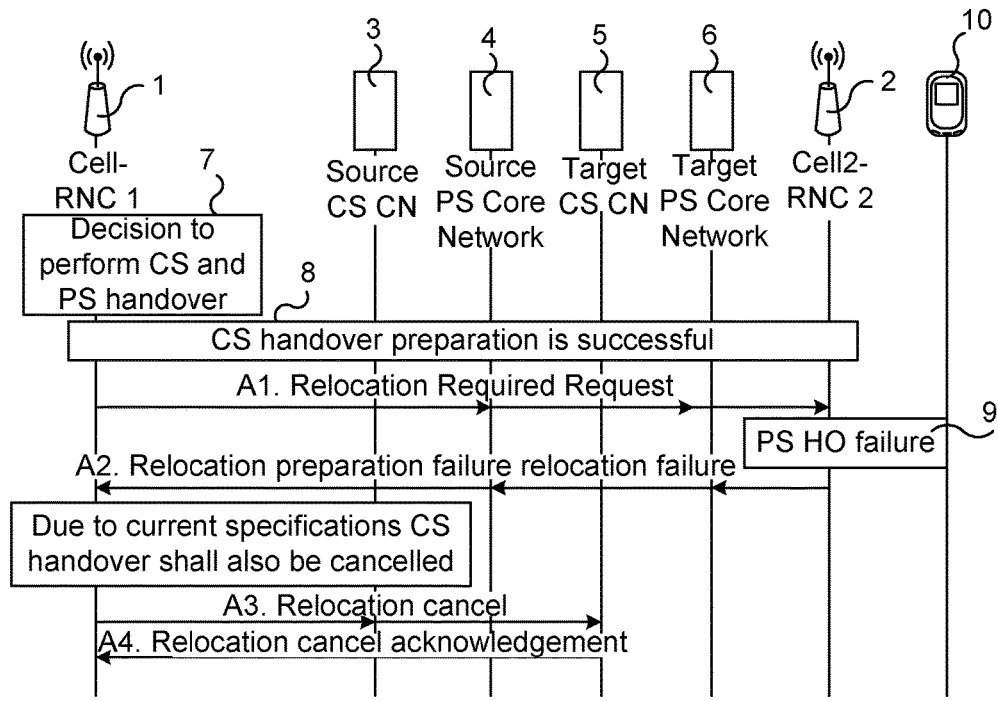
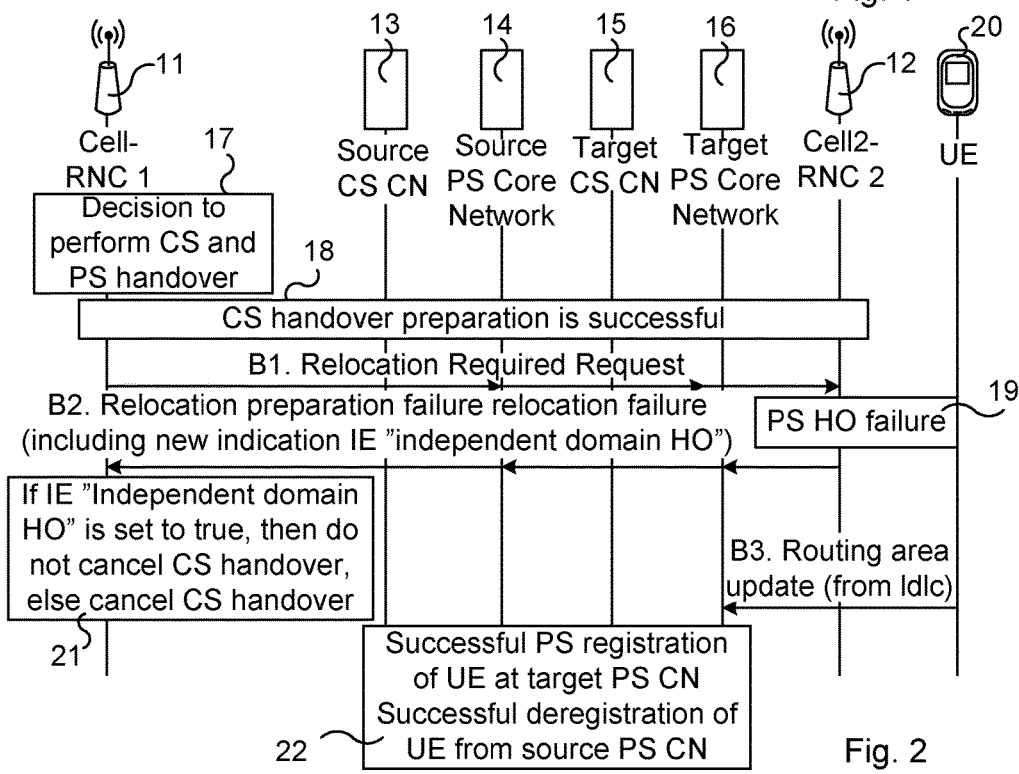
Fig. 1
Fig. 2

| IE/Group Name | Presence | Range | IE type and reference | Semantics description | Criticality | Assigned Criticality |
|---|---|---|---|---|---|---|
| Message type | M | | 9.2.1.1 | | YES | reject |
| Cause | M | | 9.2.1.4 | | YES | ignore |
| Criticality Diagnostics | O | | 9.2.1.35 | | YES | ignore |
| Inter-System Information Transparent container | O | | 9.2.1.48 | | YES | ignore |
| Independent domain HO | O | | | | YES | ignore |

| IE/Group Name | Presence | Range | IE type and reference | Semantics description |
|---|---|---|---|---|
| Independent domain HO | O | | ENUMERATED (true, false, ...) | |

SIMULTANEOUS HAND OVER IN DIFFERENT DOMAINS

This application is a 35 U.S.C. § 371 national phase filing of International Application No. PCT/SE2013/051300, filed Nov. 6, 2013, which claims the benefit of U.S. Provisional Application No. 61/754,257, filed Jan. 18, 2013, the disclosures of which are incorporated herein by reference in their entireties.

TECHNICAL FIELD

The technology disclosed herein relates generally to the field of handover in wireless communication networks, and in particular to methods during simultaneous handover in different domains.

BACKGROUND

Advanced communication devices (also denoted user equipment, UE), such as smart phones, are able to handle multiple active connections (radio access bearers, RABs) simultaneously and a user is for example able to make a phone call while at the same time downloading data. A circuit switched (CS) core network (CN) may handle one type radio access bearers and a packet switched (PS) core network may handle another type of radio access bearers. It may happen that a handover in both the CS domain and in the PS domain is needed simultaneously for a user.

Current behavior is that if handover to one domain fails then the other domain shall also be failed by the source radio access network (RAN). Assuming for example that a communication device is connected to a source RAN and has services on two domains, e.g. CS domain and PS domain; if the communication device is denied access e.g. in the PS domain due to admission control failure, it will not get service and will not be reachable/available at the target location on the PS domain. In accordance with current standard the communication device then fails the handover attempt in both domains (as specified in TS 25.413v11.2.0, section 8.6.5), even if the other domain (e.g. the CS domain in the above example) could have been handed over successfully.

FIG. 1 illustrates these current procedures in case of handover failure of one domain, and in particular an example of intra UMTS Terrestrial Radio Access Network (UTRAN) handover. FIG. 1 thus shows the handling of multiple (two in the illustrated case) domain handovers in case of relocation/handover failure in one domain according to current specifications (refer to TS 250.413v11.2.0). The existing solution is based on the specification TS 25.413v11.2.0, section 8.6.5, which quotes:

"If the source RNC receives a RELOCATION PREPARATION FAILURE message from the CN, the RNC shall initiate the Relocation Cancel procedure on the other Iu signaling connection for the UE if the other Iu signaling connection exists and if the Relocation Preparation procedure is still ongoing or the procedure has terminated successfully in that Iu signaling connection, except for the case where the relocation is to a target Closed Subscriber Group (CSG) cell where the UE is a non-member of the target CSG, and where there is at least one of the RABs that has a particular ARP value (see TS 23.060 [21]) in the other domain."

Returning to FIG. 1; the source radio network controller (RNC) 1 decides to perform both CS domain handover and PS domain handover for a communication device 10 (box indicated by reference numeral 7). The CS domain handover is successful (box indicated by reference numeral 8). The source RNC 1 sends a RELOCATION REQUIRED/REQUEST for the PS domain to the target RNC 2 via the source PS CN 4 (arrows A1). This handover fails (box indicated by reference numeral 9). The source RNC 1 receives a RELOCATION PREPARATION FAILURE/RELOCATION FAILURE from the target RNC 2 via the target PS core network (CN) 6 and source PS CN 4 (arrows A2). The source RNC 1 initiates the Relocation Cancel procedure (arrows A3) as defined in the above-mentioned specification. The target CS CN 5 then acknowledges this relocation cancelling by sending the RELOCATION CANCEL ACKNOWLEDGEMENT (arrow A4).

Failure to cancel the handover e.g. on the CS domain would imply that the communication device 10 is registered in the target coverage area for the CS domain, but cannot get registered (due to lack of granted access) in the target coverage area for the PS domain (for which the handover failed). At the same time, the source CN 4 of the PS domain believes that the communication device 10 is still under its own coverage, due to the fact that the PS handover failed (i.e. source CN 4 received a Handover/Relocation Failure message). As a result, the communication device 10 will not be reachable in the PS domain either because any Routing Area Attempts in such domain will fail.

In RAN3#77 and RAN3#78 a number of contributions (R3-122171, R3-122668 and R3-122669) were proposed attempting to address the technical problem described above. The suggested solutions in these papers propose to let one domain handover succeed, while the second domain handover is failed, without addressing the possibility that the communication device might become unreachable in the failed domain.

SUMMARY

An object of the present invention is to solve or at least alleviate at least one of the above mentioned problems.

Among its various aspects, embodiments of the teachings taught herein address the issue of simultaneous handover in the CS and PS domains in a 3GPP access or between 3GPP accesses.

The object is according to a first aspect achieved by a method in a target network node of a target core network in a first domain during handover, in the first and in a second domain, of a communication device from a source radio access network to a target radio access network. The source radio access network comprises a source access node and the target radio access network comprises a target access node. The method comprises: determining whether the communication device has access admission to the target core network; when a handover fails generating a handover failure message comprising an information element "Independent domain HandOver", wherein the information element is set to a predefined value indicating whether the handover failed due to lack of access rights or for other reasons than lack of access rights.

The object is according to a second aspect achieved by a target network node of a target core network in a first domain. The target network node is, during handover in the first and in a second domain of a communication device from a source radio access network to a target radio access network, the source radio access network comprising a source access node and the target radio access network comprising a target access node, configured to determine whether the communication device has access admission to the target core network, and when a handover fails generate a handover failure message comprising an information element "Independent domain HandOver", wherein the information element is set to a predefined value indicating whether the handover failed due to lack of access rights or for other reasons than lack of access rights.

The object is according to a third aspect achieved by a method in a source access node of a source radio access network during handover in a first domain and in a second domain of a communication device to a target network node of a target core network, the method comprises receiving a handover failure message from a source network node in the first domain comprising an information element indicating whether the handover failed due to lack of access rights or for other reasons than lack of access rights.

The object is according to a fourth aspect achieved by a source access node of a source radio access network, the source access node being configured to, during handover in a first domain and in a second domain of a communication device to a target network node of a target core network: receive a handover failure message from a source network node in the first domain comprising an information element indicating whether the handover failed due to lack of access rights or for other reasons than lack of access rights.

Further features and advantages of the present teachings will become clear upon reading the following description and the accompanying drawings.

BRIEF DESCRIPTION OF THE DRAWINGS

FIG. 1 illustrates handling of multiple domain handovers in case of handover failure in one domain according to current specifications; see TS 25.413 v 11.2.0

FIG. 2 illustrates an example embodiment of an implementation of the present disclosure.

DETAILED DESCRIPTION

Figures 3, 4:
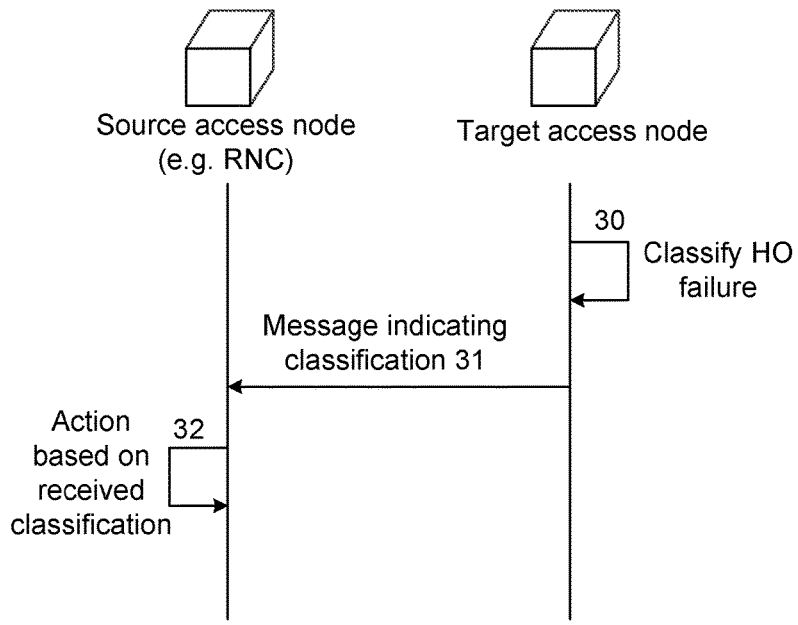
FIG. 3 is a sequence diagram illustrating an aspect of the present disclosure.
FIG. 4 illustrates another example embodiment of the present disclosure comprising the coding of the New "Independent Domain HO" in the RELOCATION PREPARATION FAILURE message specified in TS250.413.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 2 shows an example of intra UMTS Terrestrial Radio Access Network (UTRAN) handover. However, it is noted that the scope of this disclosure is not limited to this case and is intended to cover other Radio Access Networks and cases of inter RAT mobility as well.

Referring to FIG. 2, the event of handover failure due to lack of resources at target RAN (e.g. RNC 12 and PS CN 16) is typically a temporary issue of radio resource shortage. Similar issues of handover failure at target RAN 12 could be temporary target outages or any cause deriving in a Handover failure message back to the source RAN (e.g. RNC 11). A temporary condition causing handover failure, such as resource outage, would not prevent the communication device 20 from registering from Idle with the target domain. Namely, even if the PS handover is failed, but the CS handover is successful, the communication device 20 would have the possibility, while in the target area coverage, to perform a Routing Area Update or similar registration procedures with the target PS CN 6. In this way the communication device 20 would become known to the target PS CN 16 also for the failed domain and as a consequence the target PS CN 16 would be able to deregister the communication device 20 from the source PS CN 14. Hence, the communication device 20 would become registered and thereby available/reachable for service.

However, the standard signaling to reject a handover in one of the CS and PS domains does not support differentiation of the reason for failure. This means that the source access of the handover is unable to take different action, to allow single domain handover or reject all handover.

The described current behavior is undesirable when the handover failure is for other reasons than admission control since the communication device 20 in such cases could have been granted access using idle mode mobility and thereby be reachable/available in both domains in the target access, as described above with reference to FIG. 2.

In particular, denied handover during mobility of radio access bearers used for emergency services is not an acceptable behavior and this issue needs to be addressed in the 3GPP standard.

The current standard is thus unable to differentiate between handover failure from denied admission and failed handover from lack of resources or from any other problems encountered at the target RAN, which preclude from failed admission control.

In an aspect of the present disclosure, during CS- and PS-handover, the target access domain shall differentiate between reasons for handover failure and in the handover response back to the source access, the target access domain should include an indication that clarifies if the rejection was 1) a result of failed admission control implying that the communication device cannot register with the domain in any case (e.g. from Idle), or 2) due to other reasons, for example reasons by which the communication device failure does not imply that the communication device has no access to the failed domain.

The decision should take into account the impact from use of emergency services, i.e. perform admission control differently depending on if an emergency call is active or not.

Taking the scenario of handover UTRAN to UTRAN as a particular example: a communication device having an ongoing emergency call should be provided with both CS resources and PS resources, irrespectively of admission control failure.

LTE functionality Single Radio Voice Call Continuity (SRVCC) allows a voice over IP (VoIP) call in the PS domain to be moved to a legacy voice domain, CS domain, in case of lack of coverage in the PS domain. In this case, the present teachings may be implemented so that the network in question still attempts to keep an ongoing emergency call in the access network in which it is currently handled in order to reduce the risk of dropping the emergency call. In one embodiment of the present teachings, the target access nodes, for example access nodes such as SGSN (Serving GPRS (General Packet Radio Service) Service Node), MSC (Mobile Switching Center), MME (Mobility Management Entity), shall, during handover preparation, differentiate between handover failure causes for the communication device and classify them into one of two categories: failures due to lack of access right for the communication device 20 (i.e. failure due to admission control) or failures due to other causes not necessarily implying lack of access right for the communication device. An example of admission control failure comprises a certain restriction in the subscription not being permitted, e.g. the subscription not permitting roaming in one domain or not permitting roaming in both domains, and an example of other causes of failure comprises lack of resources.

The result of the classification (or categorization) may, in different embodiments, be indicated as a separate piece of information in the RELOCATION PREPARATION FAILURE message or in general in the messages conveying the handover failure event indication back to the source access RAN from one or both target domains. The source RAN (e.g. source RNC 11 of FIG. 2) shall stop the handover to both domains if the failure category for one of the two domains indicated a failure due to admission control failure.

The above is illustrated in FIG. 3 as a sequence diagram. In particular, a target access node has received at least one handover failure to a domain (not illustrated).

The target access node is adapted to classify 30 this handover failure according to the above, i.e. classify the handover failure either as a failure due to admission control or due to some other reason (e.g. lack of resources). The target access node then sends 31 a message to the source access RNC indicating the result of this classification. The source access RNC is adapted to take action 32 based on the received classification, in particular whether or not to fail also the successful handover to one domain.

The following scenarios can be envisaged (although not exhaustive list):

1) In case successful handover preparation in one domain precedes handover failure in the other domain and if the handover failure messages indicated a failure due to admission control, the source RAN shall send a relocation cancellation message for the domain where the handover preparation completed successfully.

An example of this: handover to CS domain is successful, and handover to PS domain fails. The handover failure message(s), sent from target RAN to source RAN, indicates admission control failure and the source RAN sends a relocation cancellation message to the target CS domain. The target CS domain thus fails the handover for the CS domain.

2) In case handover failure for one domain precedes any other handover preparation completion (either successful of not) for the other domain, the source RAN shall not cancel the other domain handover preparation if the handover failure messages indicated a failure not due to admission control. The other domain handover preparation shall continue and if successful, the handover shall be completed.

An example of this: handover to CS domain fails and handover to PS domain is successful (or fails). The handover failure message(s) sent from target RAN to source RAN indicates "not admission control failure". The handover to the PS domain continues and in case it is successful, the handover is completed. The communication device 20 can thus be reached in the PS domain even if the CS domain handover failed.

3) In case admission control in one domain rejects the communication device to get access, but where the rejecting domain knows that the communication device is allowed access in the other domain.

An example of this: roaming is allowed for CS only and the handover is about to take place crossing the border between two operator networks. In this case the failure message will indicate that Single Domain Handover is allowed. This means that the domain will not block/prevent handover, i.e. handover will continue provided that the other domain does not reject.

It is worth noting that if the communication device 20 fails handover due to reasons different from admission control failure, the communication device 20 can perform registration from Idle in the failed domain, e.g. via Routing Area Update procedure. If such re-attachment procedure succeeds, the communication device 20 is available and reachable in both domains and that is an objective.

Referring again to FIG. 2, the source radio network controller (RNC) 11 decides to perform both CS domain handover and PS domain handover for the communication device 20 (box indicated by reference numeral 7) and sends relocation requests for the CS domain and the PS domain. The CS domain handover is successful (box indicated by reference numeral 18). The source RNC 1 has also sent a RELOCATION REQUIRED/REQUEST for the PS domain to the target RNC 12 via the source PS CN 4 and target PS core network (arrows B1), but this handover fails (box indicated by reference numeral 19). The source RNC 11 receives a RELOCATION PREPARATION FAILURE/RELOCATION FAILURE from the target RNC 12 via the target PS core network (CN) 16 and source PS CN 14 (arrows B2). In an embodiment, this message comprises an information element (IE) based on which the source RNC 11 is able to decide whether the successful handover should be cancelled or not. In other embodiments, the IE may be included in other messages to the source node informing about the handover failure.

It is also noted that also the source node may set this IE. For example, if the source RNC 11 sends a relocation required message (the 3GPP TS 250.413 RANAP message RELOCATION REQUIRED being a particular example thereof) to the source PS CN 14 (or source CS CN 13), and the source PS CN 14 (or source CS CN 13) terminates the signaling for some reason, then the source PS CN 14 (or source CS CN 13) may include the IE in a relocation preparation failure message (3GPP TS 250.413 RANAP message RELOCATION PREPARATION FAILURE being a particular example thereof).

The present teachings are also applicable for cases wherein there is e.g. a message failure (e.g. message lost) from the target domain CN to the target access node, i.e. RNC 12 of FIG. 2. Referring again to FIG. 2, the first signaling (arrow A1) thus ends in the target PS CN 16, which has received a relocation required message. As a particular example, the source RAN 11 may send to the source PS CN the message 3GPP TS 36.413 S1AP message HANDOVER REQUIRED. Continuing the particular example of signaling, the source PS CN 14 then sends the message 3GPP TS 29.060/29.274 GTP message Forward Relocation Request to the target PS CN 16. In response thereto, the target PS CN 16 then sends to the source PS CN 14 that a message towards the target RAN (e.g. RNC 12) failed by sending the message 3GPP TS 29.060/29.274 GTP message Forward Relocation Response (failure). The response message from the target PS CN 16 to the source PS CN 14 may include the IE, informing about the type of handover failure.

The above particular examples of messages, referring to UTRAN, are not to be interpreted as limiting for the present teachings. Corresponding messages exist for other types of radio access network protocol signaling (e.g. E-UTRAN).

The IE, described more with reference to FIG. 3, may for example be denoted "Independent domain HO". The source RNC 11 decides on action based on this IE (box indicated by reference numeral 21). In particular, if the IE "Independent domain HO" is set to true, then the source RNC 11 does not cancel CS handover (which was successful), and if the IE "Independent domain HO" is set to false, then cancel the CS handover. In the former case, i.e. IE is true, the communication device 20 may perform registration from Idle to the failed PS domain, e.g. via Routing Area Update procedure (indicated at arrows B3). Thus, if the IE is true, the communication device 20 is successfully registered (box 22) at the target PS core network 16 and successfully deregistered (again, box 22) from the source PS core network 14. FIG. 4 illustrates an example of how the new "Independent Domain HO" IE, which indicates to the source RAN whether the non-failed handover shall be cancelled or not, could be implemented in the RANAP protocol (defined in T525.413). It shall be noted that the encoding of this new IE can be achieved in a similar way for other protocols similar to RANAP and for which equivalent procedures of handover cancellation are present. As illustrated, a new IE is introduced to the RANAP protocol in accordance with the present disclosure. The IE/Group name is for example Independent Domain HO. It is noted that for sake of backward compatibility, the new information element should be made optional. In preferred embodiments therefore, the value of the IE "Independent Domain HO" is set to "False" or "True". In case backward compatibility is of no issue, the IE could be either absent or present with a value "True".

Figures 5, 6:
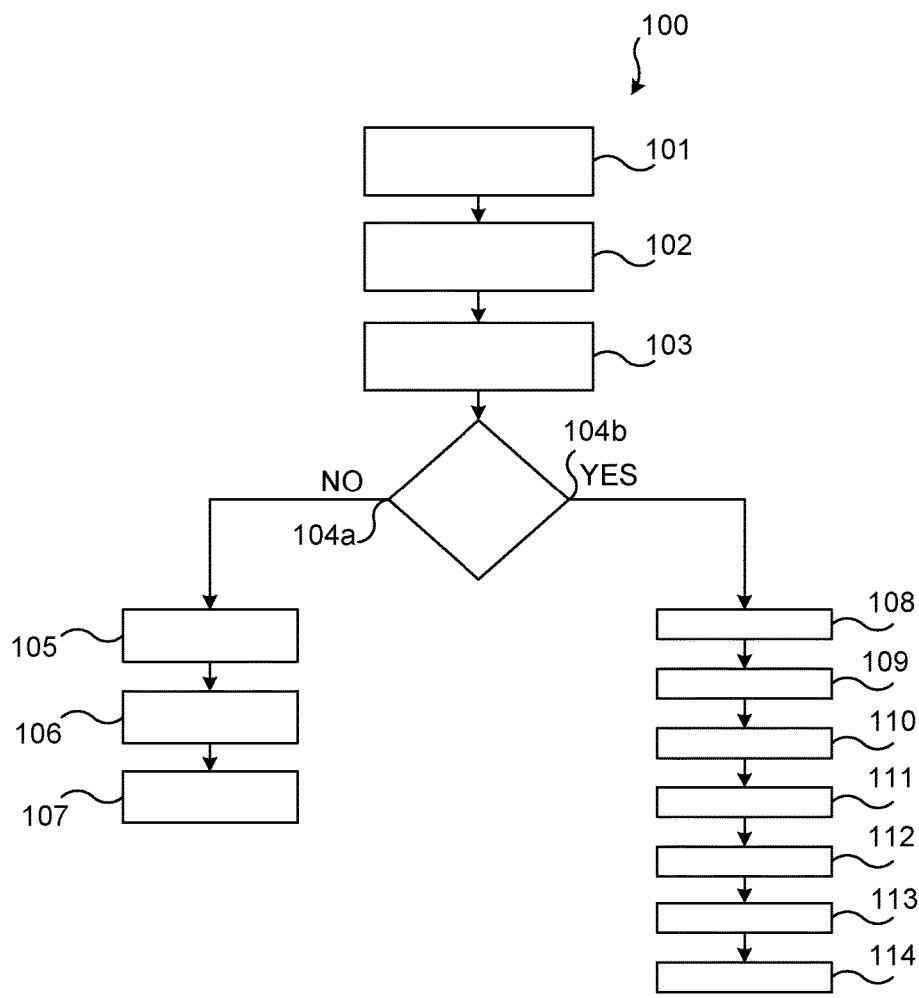
FIG. 5 illustrates another example of coding of the New "Independent Domain HO".
FIG. 6 illustrates a flowchart as an example embodiment of the present disclosure.

FIG. 5 presents an example of how the new IE could be encoded with enumerated values. The enumerated value choices could be different from those shown in the figure, for example, the IE could assume values ("No Access Granted", "Access Granted", . . . ). Some particular examples:

1) The new IE is not included

The RNC is expected to behave as it does today. This ensures backwards compatibility.

2) The new IE is included, value=Access Granted

The domain for which the message is sent allows the source RNC to perform single domain handover of the other domain, and the RNC will do so provided that the handover preparation for the other domain is successful.

3) The new IE is included, value=No Access Granted

The domain for which the message is sent indicates that the source RAN is not allowed to continue with a single domain handover. This thus indicates that source RAN shall not continue. It is noted that current standard does not allow single domain handover but will wait for a response or timeout from both domains before aborting, while an explicit response in accordance with example 3) indicates to source RAN that it's not allowed to continue. It means that it does not have to wait for a response from the other domain before aborting, this embodiment thus providing a faster abortion compared to current standard.

In another example embodiment, the target CN sets up the value of the new IE introduced in the handover failure message not necessarily to mirror whether the UE has access to the target domain or not, but in order to respect a policy, for example set by an operator, by which successful handovers for one domain shall not be cancelled in case handovers occurring at the same time for another domain are subject to failure.

This could be the case of successful handovers involving bearers subject to special treatment, such as emergency service bearers. In these cases the target CN of the failed handover domain may set the "Independent Domain HO" IE to prevent cancellation of the handover for which preparation was successful, even if the handover failed due to lack of access right by the communication device 20. That is, even if admission control would prevent the communication device 20 from accessing the target node for which handover preparation was successful, it should still be allowed to make the emergency call.

In this particular embodiment, the solution gives freedom to an operator do establish a policy according to which handovers involving bearers associated to specific services are always successfully completed (when possible) and never cancelled due to handover failures in other domains.

By means of aspects of the present disclosure an operator is allowed to apply flexible policies and to enable handovers to complete successfully even when other handovers occurring in parallel and for other domains are subject to failure. Such flexibility takes into consideration whether the communication device 20 was subject to handover failure due to lack of access rights in the target domain or due to other reasons, e.g. lack of radio resources at target RAN.

This is especially useful for handover of bearers associated with emergency services, when for example the emergency service bearer over the CS domain is allowed to hand over successfully but the PS domain handover may fail. This invention gives the option of letting the CS domain handover to complete successfully and therefore allows the user to continue e.g. an emergency call, while it allows the communication device 20 to perform idle mode access change in the PS domain and to register successfully, if possible, at the domain where the handover failed.

FIG. 6 illustrates a flowchart as an example embodiment of the present disclosure. It should be noted that the method 100 is illustrated by way of example with an RNC as a source node in the source RAN and an RNC as the target node in the target RAN. However, alternatively the source node in the source RAN and the target node in the target RAN could be e.g. an evolved NodeB (eNodeB), a NodeB or any other base station in a RAN. In the source and target network, methods according the present disclosure may be performed e.g. in one or several of the Serving GPRS Support Node (S-GSN), the Mobile Switching Center (MSC) or the Mobility Management Entity (MME). The steps are indicated by boxes and corresponding reference numerals, and the method 100 may be performed in the indicated order. It is noted that some steps (boxes) may, for some embodiments, be omitted. The following steps might be performed:

101—The source RNC 11 sends relocation required message for a first domain to source core network.

102—The source core network forwards the relocation required message for the first domain to the target core network. As a particular example, in the PS domain this may be achieved by GPRS Tunneling Protocol (GTP) signaling of the Forward Relocation Request message.

103—Target core network runs access admission control for the communication device for the first domain.

104a-If the target core network for the first domain is restricted for use by the communication domain (as determined in box 103), i.e. access admission fails for first domain then the flow continues to box 105.

105—Target core network of the first domain does not send a relocation request to the target RNC (RNC2).

Target core network indicates a relocation preparation failure response (e.g. generates and sends a message) to the source core network including an information element "Independent domain HO" whereby the IE is set to a predefined value indicating that the relocation preparation failed due to lack of access rights; if the UE is determined not to have access admission, the IE "Independent domain HO" may be set to "FALSE". The indication of relocation preparation failure sent from the target core network to the source core network may be sent using GTP signaling and the GTP message Forward Relocation Response when the domain is the PS domain.

106—The source core network forwards the relocation preparation failure message to the source RNC.

107—The source RNC aborts any handover attempt for the second domain. However, handover attempts/relocation attempts may be continued for the communication device in the other domain if the IE "Independent domain HO" indicates that the relocation preparation failed for other reasons than lack of access rights.

104b-If access admission (as determined in box 103) is successful for first domain then the flow continues to box 108.

108—The target core network of the first domain sends the relocation request message towards the target RNC (RNC2).

109—The target RNC cannot accept communication device, e.g. due to lack of resources for the first domain.

110—The relocation fails for first domain, e.g. the RNC may determine the relocation as failed for the first domain.

111—The target RNC sends a relocation failure message to target core network of the first domain.

112—The target core network of the first domain indicates a relocation preparation failure (e.g. generates and sends a message) to the source core network including an information element IE "independent domain HO" whereby the IE is set to a predefined value indicating that the relocation preparation failed for other reasons than lack of access rights; the IE "Independent HO domains" may be set to "TRUE". The indication of relocation preparation failure sent from the target core network to the source core network may be sent using GTP signaling and the GTP message Forward Relocation Response when the domain is the PS domain.

113—The source core network of the first domain sends (e.g. forwards) the relocation preparation failure message to the source RNC.

114—The RNC continues handover procedures for the second domain.

In the following, example embodiments of the present disclosure are described:

1) Method performed in a node in a target radio network, e.g. in a target core network, for a first domain during handover of a communication device in the first and in a second domain from a source RAN to a target RAN, the source RAN comprising a source node and the target RAN comprising a target node, the method comprising:
    determining whether the communication device has access admission to the target radio network (in particular determining individually per domain whether the communication device is allowed access in the target radio network, e.g. target core network)
    if the relocation preparation fails generating a relocation preparation failure message including an information element, IE, "Independent domain HO" whereby the IE is set to a predefined value indicating whether the relocation preparation for the domain failed due to lack of access rights or for other reasons than lack of access rights.

2) Method according to embodiment 1, further comprising the steps of:
    if the communication device is determined to have access admission, generating a relocation request message towards the target RNC.

3) Method according to embodiment 2, further comprising the step of:
    receiving from the target node an indication that target node cannot accept the communication device in the domain (in particular, temporarily cannot accept the communication device in the domain) and
    setting the IE "Independent domain HO" to a predefined value indicating that the relocation preparation failed due to other reasons than lack of access rights (in particular, indicating that the relocation preparation failed due to a temporary failure in the domain).

4) Method according to embodiment 1, further comprising the step of:
    if the communication device is determined not to have access admission, setting the IE "Independent HO domains" to a predefined value indicating that the relocation preparation failed due to lack of access rights.

5) Method in a source network node in a source RAN during handover of a communication device to a target core network in a first domain and in a second domain, the method comprising:
    receiving a relocation preparation failure message from a source core network node in the first domain comprising an information element indicating whether the relocation preparation failed due to lack of access rights or for other reasons than lack of access rights.

6) Method according to embodiment 5, comprising the step of:
    Continuing handover preparation for the communication device in the other domain if the IE "Independent HO domains" indicates that the relocation preparation failed for other reasons than lack of access rights.

7) Method according to embodiment 5, comprising the steps of:
    continuing handover preparation for the communication device in the other domain if the IE "Independent domain HO" indicates that the relocation preparation failed due to lack of access rights and the handover relates to an emergency service bearer or to any specifically labelled bearer with assigned policy mandating handover cancellation avoidance.

Such a specifically labelled bearer could e.g. be a bearer not related to an emergency service, but e.g. used by an operator for testing purposes or prioritized by an operator for other reasons.

Stated differently, each domain indicates at a relocation/handover preparation failure that the failure is a result of either a temporary issue or a permanent issue. The source RAN may then decide to continue or stop relocation/handover of the communication device. However, the source node may select to proceed with handover even if one domain indicates a permanent failure (lack of access rights). The decision by source RAN regarding the continuing with the single domain relocation/handover or to abort may be taken independently of whether the error condition in the failing domain is a result of a temporary or a permanent error.

8) Method according to embodiment 3, comprising the step of setting the IE "Independent domain HO" to "TRUE.

9) Method according to embodiment 4, comprising the step of setting the IE "Independent domain HO" to "FALSE".

10) Node in a target core network in a first domain during handover of a communication device in the first and in a second domain from a source RAN to a target RAN, the source RAN comprising a source node and the target RAN comprising a target node comprising:
    means configured for determining whether the UE has access admission to the target core network,
    means configured for generating a relocation preparation failure message including an information element, IE, "Independent domain HO" whereby the IE is set to a predefined value indicating whether the relocation preparation failed due to lack of access rights or for other reasons than lack of access rights if the relocation preparation fails.

11) Source Network node in a source RAN during handover of a communication device to a target core network in a first domain and in a second domain comprising
    means configured for receiving a relocation preparation failure message from a source core network node in the first domain comprising an information element indicating whether the relocation preparation failed due to lack of access rights or for other reasons than lack of access rights.

Figure 7:
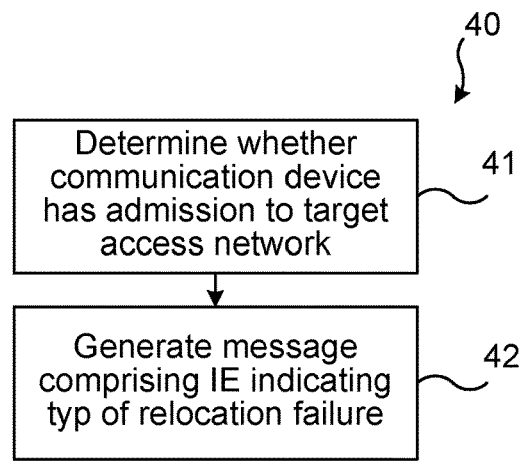
FIG. 7 illustrates a flow chart over steps of a method in a target network node in accordance with the present disclosure.

FIG. 7 illustrates a flow chart over steps of a method in a target network node in accordance with the present disclosure. The method 40 may thus be performed in the target network node 16 of a target core network in a first domain during handover, in the first and in a second domain, of a communication device 20 from a source radio access network to a target radio access network. The source radio access network comprises a source access node 11 and the target radio access network comprising a target access node 12. The method 40 comprises:
    determining 41 whether the communication device 20 has access admission to the target core network,
    when a handover fails generating 42 a handover failure message comprising an information element "Independent domain HandOver", wherein the information element is set to a predefined value indicating whether the handover failed due to lack of access rights or for other reasons than lack of access rights.

In an embodiment the handover failure comprises a relocation preparation fails and the handover failure message comprises a relocation preparation failure message comprising the information element "Independent domain HandOver", wherein the information element is set to a predefined value indicating whether the relocation preparation failed due to lack of access rights or for other reasons than lack of access rights.

In an embodiment the method 40 further comprises generating a relocation request message towards the target access node 12, when the communication device 20 is determined to have access admission.

In a variation of the above embodiment the method 40 further comprises:
    receiving, from the target access node 12 an indication that the target access node 12 cannot accept the communication device 20, (in particular cannot accept the communication device 20 in the first domain) and
    setting the information element "Independent domain HO" to a predefined value indicating that the relocation preparation failed due to other reasons than lack of access rights.

In a variation of the above embodiment, the method 40 comprises setting the information element "Independent domain HO" to "TRUE".

In an embodiment the method 40 further comprises:
    setting the information element "Independent HO domains" to a predefined value indicating that handover failed due to lack of access rights, when the communication device 20 is determined not to have access admission ((in particular have access in the first domain).

In a variation of the above embodiment the method 40 comprises setting the information element "Independent domain HO" to "FALSE".

Figure 8:
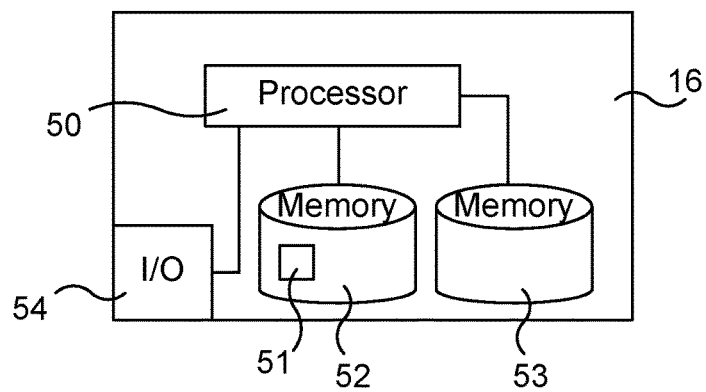
FIG. 8 illustrates schematically a target network node and means for implementing methods of the present disclosure.

FIG. 8 illustrates schematically a target network node and means for implementing methods of the present disclosure. The target network node comprises input/output devices 54 (illustrated as a single I/O device, although several devices may be used) for communicating with other network nodes, wired and/or wireless connections.

The target network node comprises a processor 50 comprising any combination of one or more of a central processing unit (CPU), multiprocessor, microcontroller, digital signal processor (DSP), application specific integrated circuit etc. capable of executing software instructions stored in a memory 52, which can thus be a computer program product 52. The processor 50 can be configured to execute any of the various embodiments of the method as described in relation to FIG. 6.

The target network node 16 of a target core network in a first domain is configured to perform various steps during handover in the first and in a second domain of a communication device 20 from a source radio access network to a target radio access network. The source radio access network comprises a source access node 11 and the target radio access network comprises a target access node 12. In particular, the target network node 16 is configured to:
    determine whether the communication device 20 has access admission to the target core network, and
    when a handover fails generate a handover failure message comprising an information element "Independent domain HandOver", wherein the information element is set to a predefined value indicating whether the handover failed due to lack of access rights or for other reasons than lack of access rights (in particular for other reasons than lack of access rights in the first domain).

In an embodiment, the handover failure comprises a relocation preparation fails and the handover failure message comprises a relocation preparation failure message comprising the information element "Independent domain HandOver", wherein the information element is set to a predefined value indicating whether the relocation preparation failed due to lack of access rights or for other reasons than lack of access rights.

In an embodiment, the target network node 16 is configured to generate a relocation request message towards the target access node 12, when the communication device 20 is determined to have access admission.

In a variation of the above embodiment, the target network node 16 is configured to:

receive, from the target access node 12 an indication that the target access node 12 cannot accept the communication device 20, and set the information element "Independent domain HO" to a predefined value indicating that the relocation preparation failed due to other reasons than lack of access rights.

In a variation of the above embodiment, the target network node 16 is configured to set the information element "Independent domain HO" to "TRUE".

In an embodiment, the target network node 16 is configured to:

set the information element "Independent HO domains" to a predefined value indicating that handover failed due to lack of access rights, when the communication device (20) is determined not to have access admission.

In a variation of the above embodiment, the target network node 16 is configured to set the information element "Independent domain HO" to "FALSE".

Still with reference to FIG. 8, the memory 52 can be any combination of read and write memory (RAM) and read only memory (ROM). The memory 52 also comprises persistent storage, which, for example, can be any single one or combination of magnetic memory, optical memory, solid state memory or even remotely mounted memory.

A data memory 53 may also be provided for reading and/or storing data during execution of software instructions in the processor 50. The data memory 53 can be any combination of read and write memory (RAM) and read only memory (ROM).

The teachings of the present application also encompasses a computer program product 52 comprising a computer program 51 for implementing the methods as described above, and a computer readable means on which the computer program 51 is stored. The computer program product 52 may be any combination of read and write memory (RAM) or read only memory (ROM). The computer program product 33 may also comprise persistent storage, which for example can be any single one or combination of magnetic memory, optical memory or solid state memory.

Figure 9:
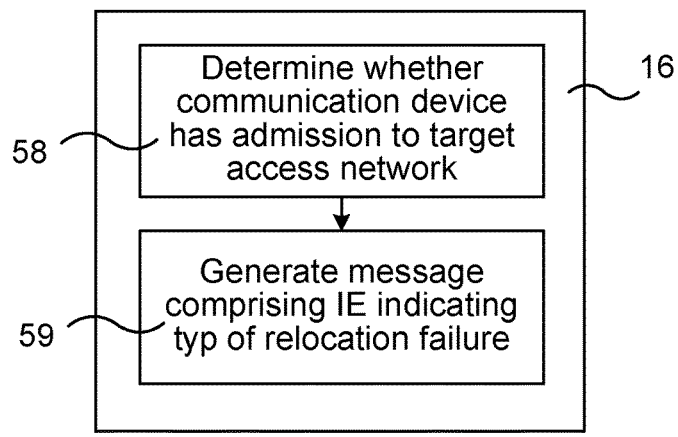
FIG. 9 illustrates a target network node comprising functions modules/software modules for implementing methods of the present teachings.

FIG. 9 illustrates a target network node comprising functions modules/software modules for implementing methods of the present teachings. In particular, FIG. 9 illustrates a target network node 16 comprising functions modules for implementing methods of the present teachings. The target network node 16 comprises means, in particular a first function module 58, for determining whether the communication device 20 has access admission to the target core network. The target network node 16 comprises means, in particular a second function module 59, for generating, when a handover fails, a handover failure message comprising an information element "Independent domain HandOver", wherein the information element is set to a predefined value indicating whether the handover failed due to lack of access rights or for other reasons than lack of access rights.

The functional modules 58, 59 can be implemented using software instructions such as computer program executing in a processor and/or using hardware, such as application specific integrated circuits, field programmable gate arrays, discrete logical components etc.

The computer program product, or the memory, thus comprises instructions executable by the processor. Such instructions may be comprised in a computer program, or in one or more software modules or function modules.

Figure 10:
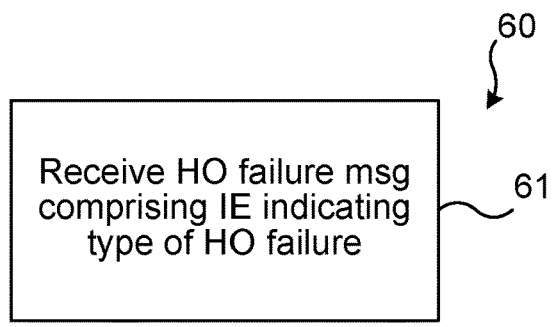
FIG. 10 illustrates a flow chart over steps of a method in a source network node in accordance with the present disclosure.

FIG. 10 illustrates a flow chart over steps of a method in a source network node in accordance with the present disclosure. The method 60 may thus be performed in a source access node 11 of a source radio access network during handover in a first domain and in a second domain of a communication device 20 to a target network node 16 of a target core network. The method 50 comprises:

receiving 61 a handover failure message from a source network node 14 in the first domain comprising an information element indicating whether the handover failed due to lack of access rights or for other reasons than lack of access rights.

In an embodiment, the handover failure comprises a relocation preparation failure and the handover failure message comprises a relocation preparation failure message comprising the information element "Independent domain HandOver", wherein the information element is set to a predefined value indicating whether the relocation preparation failed due to lack of access rights or for other reasons than lack of access rights.

In an embodiment, the method 60 comprises continuing handover preparation for the communication device in the second domain when the information element "Independent HO domains" indicates that the relocation preparation failed for other reasons than lack of access rights.

In another embodiment, the method 60 comprises continuing handover preparation for the communication device 20 in the second domain when the information element "Independent domain HO" indicates that the handover failed due to lack of access rights and the handover relates to an emergency service bearer or to any specifically labeled bearer with assigned policy mandating handover cancellation avoidance.

In a variation of the above embodiment, the specifically labeled bearer comprises a bearer used by an operator of the source access network for testing purposes or a bearer prioritized by an operator for other reasons.

Figure 11:
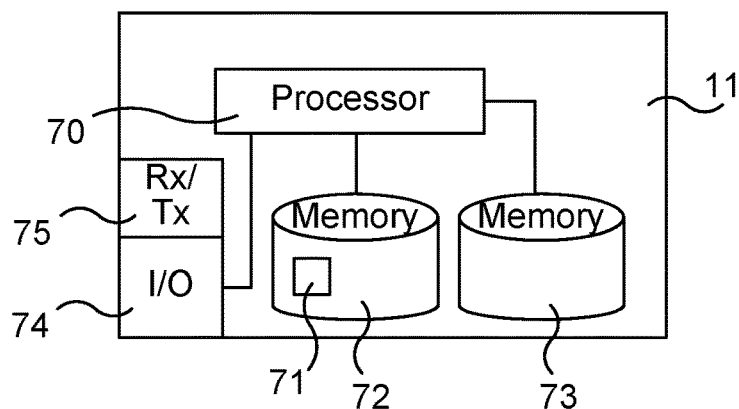
FIG. 11 illustrates schematically a source network node and means for implementing methods of the present disclosure.

FIG. 11 illustrates schematically a source network node and means for implementing methods of the present disclosure. The source network node 11 comprises input/output devices 74 (illustrated as a single I/O device, although several devices may be used) for communicating with other network nodes, wired and/or wireless connections. The source network node 11 may comprise transceiver device(s) 75, comprising receiving circuitry, transmitting circuitry, and antenna devices etc., for enabling wireless communication with communication devices 20.

The source network node comprises a processor 70 comprising any combination of one or more of a central processing unit (CPU), multiprocessor, microcontroller, digital signal processor (DSP), application specific integrated circuit etc. capable of executing software instructions stored in a memory 72, which can thus be a computer program product 72. The processor 70 can be configured to execute any of the various embodiments of the method as described in relation to FIG. 6.

The source access node 11 is a node of a source radio access network. The source access node 11 is configured to perform various steps during handover in a first domain and in a second domain of a communication device 20 to a target network node 16 of a target core network. In particular, the source access node 11 is configured to receive a handover failure message from a source network node 14 in the first domain comprising an information element indicating whether the handover failed due to lack of access rights or for other reasons than lack of access rights.

In an embodiment, the handover failure comprises a relocation preparation failure and the handover failure message comprises a relocation preparation failure message comprising the information element "Independent domain HandOver", wherein the information element is set to a predefined value indicating whether the relocation preparation failed due to lack of access rights or for other reasons than lack of access rights.

In an embodiment, the source network node 11 is configured to continue handover preparation for the communication device in the second domain when the information element "Independent HO domains" indicates that the relocation preparation failed for other reasons than lack of access rights.

In an embodiment, the source network node 11 is configured to continue handover preparation for the communication device (20) in the second domain when the information element "Independent domain HO" indicates that the handover failed due to lack of access rights and the handover relates to an emergency service bearer or to any specifically labelled bearer with assigned policy mandating handover cancellation avoidance.

In a variation of the above embodiment, the specifically labelled bearer comprises a bearer used by an operator of the source access network for testing purposes or a bearer prioritized by an operator for other reasons.

Still with reference to FIG. 11, the memory 72 can be any combination of read and write memory (RAM) and read only memory (ROM). The memory 72 also comprises persistent storage, which, for example, can be any single one or combination of magnetic memory, optical memory, solid state memory or even remotely mounted memory.

A data memory 73 may also be provided for reading and/or storing data during execution of software instructions in the processor 70. The data memory 73 can be any combination of read and write memory (RAM) and read only memory (ROM).

The teachings of the present application also encompasses a computer program product 72 comprising a computer program 71 for implementing the methods as described above, and a computer readable means on which the computer program 71 is stored. The computer program product 72 may be any combination of read and write memory (RAM) or read only memory (ROM). The computer program product 33 may also comprise persistent storage, which for example can be any single one or combination of magnetic memory, optical memory or solid state memory.

Figure 12:
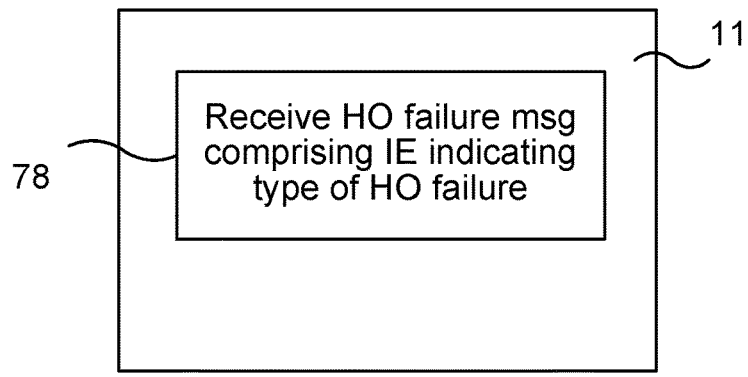
FIG. 12 illustrates a source network node comprising functions modules/software modules for implementing methods of the present teachings.

FIG. 12 illustrates a source network node comprising functions modules/software modules for implementing methods of the present teachings. In particular, the source network node 11 may comprise function modules for implementing the methods of the present teachings. The source network node 11 may comprise a first function module 78 for receiving a handover failure message from a source network node 14 in the first domain comprising an information element indicating whether the handover failed due to lack of access rights or for other reasons than lack of access rights.

The functional module 78 can be implemented using software instructions such as computer program executing in a processor and/or using hardware, such as application specific integrated circuits, field programmable gate arrays, discrete logical components etc.

The computer program product, or the memory, thus comprises instructions executable by the processor. Such instructions may be comprised in a computer program, or in one or more software modules or function modules.

The invention has mainly been described herein with reference to a few embodiments. However, as is appreciated by a person skilled in the art, other embodiments than the particular ones disclosed herein are equally possible within the scope of the invention, as defined by the appended patent claims.

ABBREVIATIONS

HO—Handover
IE—Information element
RNC—Radio Network controller
RAN—Radio Access Network
UE—User Equipment
CSG—Closed Subscriber Group
SGSN—Serving GPRS (General Packet Radio Service) Service Node
MSC—Mobile Switching Center
MME—Mobility Management Entity
MSC—Mobile Switching Center
MME—Mobility Management Entity

The invention claimed is:

1. A method in a target network node of a target core network in a first domain during handover, in the first and in a second domain, of a communication device from a source radio access network to a target radio access network, the source radio access network comprising a source access node and the target radio access network comprising a target access node, the method comprising:
   determining whether the communication device has access admission to the target core network;
   generating a relocation request message towards the target access node, when the communication device is determined to have access admission;
   receiving, from the target access node, an indication that the target access node cannot accept the communication device; and
   when a handover from the source radio access network fails, generating a handover failure message comprising an information element "Independent domain HandOver", wherein:
      the information element is set to a predefined value indicating that the handover failed due to lack of access rights, when the communication device is determined not to have access admission; and
      the information element is set to a predefined value indicating that the handover failed for other reasons than lack of access rights, when the communication device is determined to have access admission, wherein the other reason is a temporary failure in the domain;
   wherein the source radio access network comprises a Universal Terrestrial Radio Access, UTRAN, or Evolved UTRAN, E-UTRAN, radio access network.

2. The method as claimed in claim 1, wherein the handover failure comprises the relocation preparation failure and the handover failure message comprises a relocation preparation failure message comprising the information element "Independent domain HandOver", wherein the information element is set to a predefined value indicating whether the relocation preparation failed due to lack of access rights or for other reasons than lack of access rights.

3. The method as claimed in claim 1, comprising setting the information element "Independent domain HO" to "TRUE".

4. The method as claimed in claim 1, further comprising:
setting the information element "Independent HandOver domains" to a predefined value indicating that handover failed due to lack of access rights, when the communication device is determined not to have access admission.

5. The method as claimed in claim 4, comprising of setting the information element "Independent domain HandOver" to "FALSE".

6. A target network node of a target core network in a first domain, the target network node being, during handover in the first and in a second domain of a communication device from a source radio access network to a target radio access network, the source radio access network comprising a source access node and the target radio access network comprising a target access node, configured to:
determine whether the communication device has access admission to the target core network;
generate a relocation request message towards the target access node, when the communication device is determined to have access admission;
receive, from the target access node, an indication that the target access node cannot accept the communication device; and
when a handover from the source radio access network fails, generating a handover failure message comprising an information element "Independent domain HandOver", wherein:
the information element is set to a predefined value indicating that the handover failed due to lack of access rights, when the communication device is determined not to have access admission; and
the information element is set to a predefined value indicating that the handover failed for other reasons than lack of access rights, when the communication device is determined to have access admission, wherein the other reasons include a temporary failure in the domain;
wherein the source radio access network comprises a Universal Terrestrial Radio Access, UTRAN, or Evolved UTRAN, E-UTRAN, radio access network.

7. The target network node as claimed in claim 6, wherein the handover failure comprises the relocation preparation failure and the handover failure message comprises a relocation preparation failure message comprising the information element "Independent domain HandOver," wherein the information element is set to a predefined value indicating whether the relocation preparation failed due to lack of access rights or for other reasons than lack of access rights.

8. The target network node as claimed in claim 6, being configured to set the information element "independent domain HO HandOver" to "TRUE".

9. The target network node as claimed in claim 6, further being configured to:
set the information element "independent HandOver domains" to a predefined value indicating that handover failed due to lack of access rights, when the communication device is determined not to have access admission.

10. The target network node as claimed in claim 9, being configured to set the information element "Independent domain HandOver" to "FALSE".

11. A method in a source access node of a source radio access network during handover in a first domain and in a second domain of a communication device to a target network node of a target core network, the source radio access network comprising a Universal Terrestrial Radio Access, UTRAN, or Evolved UTRAN, E-UTRAN, radio access network, the method comprising:
receiving a handover failure message from a source network node in the first domain comprising:
an information element indicating that the handover failed due to lack of access rights, when the communication device is determined not to have access admission; and
the information element indicating that the handover failed for other reasons than lack of access rights when the communication device is determined to have access admission; wherein the other reason is a temporary failure in the domain; and
continuing handover preparation for the communication device in the second domain when the information element "Independent domain HandOver" indicates that the handover failed due to lack of access rights and the handover relates to an emergency service bearer or to any specifically labelled bearer with assigned policy mandating handover cancelation avoidance.

12. The method as claimed in claim 11, wherein the handover failure comprises a relocation preparation failure and the handover failure message comprises a relocation preparation failure message comprising the information element "independent domain HandOver," wherein the information element is set to a predefined value indicating whether the relocation preparation failed due to lack of access rights or for other reasons than lack of access rights.

13. The method as claimed in claim 11, comprising:
continuing the handover preparation for the communication device in the second domain when the information element "Independent HandOver domains" indicates that the relocation preparation failed for other reasons than lack of access rights.

14. The method as claimed in claim 11, wherein the specifically labeled bearer comprises a bearer used by an operator of the source access network for testing purposes or a bearer prioritized by an operator for other reasons.

15. A source access node of a source radio access network, the source radio access network comprising a Universal Terrestrial Radio Access, UTRAN, or Evolved UTRAN, E-UTRAN, radio access network, the source radio access network being configured to, during handover in a first domain and in a second domain of a communication device to a target network node of a target core network:
receive a handover failure message from a source network node in the first domain comprising:
an information element indicating that the handover failed due to lack of access rights, when the communication device is determined not to have access admission; and
the information element indicating that the handover failed for other reasons than lack of access rights when the communication device is determined to have access admission; wherein the other reason is a temporary failure in the domain; and
continue handover preparation for the communication device in the second domain when the information element "Independent domain HandOver" indicates that the handover failed due to lack of access rights and the handover relates to an emergency service bearer or to any specifically labelled bearer with assigned policy mandating handover cancelation avoidance.

16. The source access node as claimed in claim 15, wherein the handover failure comprises a relocation preparation failure and the handover failure message comprises a relocation preparation failure message comprising the information element "Independent domain HandOver," wherein the information element is set to a predefined value indicating whether the relocation preparation failed due to lack of access rights or for other reasons than lack of access rights.

17. The source access node as claimed in claim 15, being configured to:
- continue the handover preparation for the communication device in the second domain when the information element "Independent HandOver domains" indicates that the relocation preparation failed for other reasons than lack of access rights.

18. The source access node as claimed in claim 15, wherein the specifically labelled bearer comprises a bearer used by an operator of the source access network for testing purposes or a bearer prioritized by an operator for other reasons.

* * * * *